(12) United States Patent
Perlman

(10) Patent No.: US 6,346,663 B1
(45) Date of Patent: Feb. 12, 2002

(54) WATER-PERMEABLE POLYMER-TREATED CANE REEDS FOR WIND INSTRUMENTS

(76) Inventor: Daniel Perlman, 94 Oakland Ave., Arlington, MA (US) 02476

(*) Notice: Subject to any disclaimer, the term of this patent is extended or adjusted under 35 U.S.C. 154(b) by 0 days.

(21) Appl. No.: 09/687,370

(22) Filed: Oct. 13, 2000

(51) Int. Cl.[7] ................................. G10D 9/02
(52) U.S. Cl. .................................... 84/383 A
(58) Field of Search ...................... 84/383, 383 A, 84/380 A (56) References Cited

U.S. PATENT DOCUMENTS

| | | | | |
|---|---|---|---|---|
| 1,776,566 A | * | 9/1930 | Newton et al. ............... | 84/383 |
| 1,790,167 A | * | 1/1931 | Ogilvie ........................ | 84/383 |
| 3,340,759 A | * | 9/1967 | Petzke ......................... | 84/383 |
| 5,379,673 A | * | 1/1995 | Vogt ........................... | 84/383 A |

* cited by examiner

Primary Examiner—Jeffrey Donels
Assistant Examiner—Kim Lockett
(74) Attorney, Agent, or Firm—Weingarten, Schurgin, Gagnebin & Lebovici LLP (57) ABSTRACT

A method for treating the natural cane reed used in woodwind musical instruments. The method includes contacting at least the proximal portion of said reed with a polymer treatment liquid, in which the liquid delivers at least 1% by weight of polymer into the reed, based upon the percentage increase in dry weight of that portion of said reed contacted by the liquid. The reed remains substantially water-permeable, yet is rendered resistant to degradation by saliva. An impregnated reed is also described, in which at least the proximal portion of the reed has been impregnated by a liquid that includes a non-toxic polymeric material that is water-insoluble upon drying or curing within the reed. The impregnated portion of the reed is at least 25% as permeable to water as an identical portion of an equivalent untreated reed, yet is resistant to degradation by saliva.

18 Claims, 3 Drawing Sheets

+ — + Aqueous Polyurethane Uptake (milligrams)
• — • Reed Dry Weight Increase (milligrams polyurethane)

WATER-PERMEABLE POLYMER-TREATED CANE REEDS FOR WIND INSTRUMENTS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention generally relates to methods and compositions for treating the natural cane reed used in woodwind instruments, employing a polymer or polymerizing solution, preferably a waterborne polymer or waterborne polymerizing solution, to impregnate and protect the reed from saliva-related microbial and enzymatic degradation, without rendering the reed waterproof.

The wooden reed used in woodwind instruments is usually cut from natural cane (e.g., the species *Arundo donax*). Being highly porous, the reed is susceptible over time, to infiltration and degradation by contact with saliva during playing. As a musician blows air over a cane reed, which is typically clamped at its distal end or "heel" in the instrument's mouthpiece, the reed is caused to vibrate, thereby inducing vibrations in the moving column of air within the instrument to produce musical tones. During a single playing session, the physical and musical properties of a reed may change for the better or worse. This is not surprising, because even after several minutes pre-soaking, i.e., "conditioning," of the mouth end of the reed in water, the subsequent contact with warm saliva during a playing session tends to further soften the reed. Some softening may be beneficial during the initial breaking-in period when a reed is new and somewhat unresponsive. However, after an initial period during which the reed may become optimally playable (over a few days or even after a week or more), any further softening may be undesirable. That is, as the cane structure becomes degraded and the reed becomes too flexible, the reed must be discarded.

There is considerable variability in the sound quality and longevity of individual cane reeds, even within a group of presumably equivalent reeds from any particular manufacturer. In fact, a musician may find that no more than one or two out of every ten reeds possess ideal tone and playing characteristics. Due to difficulties and frustrations with the lack of uniformity and short lifetime of natural cane reeds, a number of synthetic reeds, composite reeds and structurally reinforced natural reeds have been developed. A number of exemplary patents detailing such structurally modified reeds follows. Fiber-reinforced plastic reeds are described in Brilhart, U.S. Pat. No. 2,919,617. Reeds containing glass fiber-reinforced synthetic resin are described in Burns, U.S. Pat. No. 3,165,963. Synthetic reeds are described in Gamble, U.S. Pat. Nos. 3,905,268 and 4,014,241. Shaffer, U.S. Pat. No. 4,355,560, describes a synthetic composite reed structure producing an acoustic impedance similar to the cane reed. Backus, U.S. Pat. No. 4,337,683 describes a graphite-reinforced epoxy resin synthetic woodwind reed having proper elasticity and density. Cusack et al., U.S. Pat. No. 5,227,572 describes a titanium reed for woodwind instruments. Hartmann et al., U.S. Pat. No. 5,542,331 describes a fiber-reinforced plastic reed in which different fiber materials are combined for the purpose of damping vibrations.

Extending the lifetime of natural cane reeds has been the goal of a number of previous inventors. These inventors have appreciated that in addition to mechanical fatigue, degradative enzymes, bacteria and other constituents of human saliva infiltrate the porous structure of the cane reed during use, and contribute to a shortened lifetime. Reed failure may occur suddenly, as when the tip of the reed splits, or may occur gradually as the reed softens and loses tone quality. Rinsing the reed is only partially effective in removing enzymes, bacteria and saliva residues. Vogt, U.S. Pat. No. 5,379,673, describes a hydrogen peroxide and humectant-containing composition for soaking, disinfecting and conditioning natural cane reeds after use, to prolong their life.

To inhibit the process of reed degradation by saliva, inventors have developed a number of protective coating treatments for the natural cane reed. As early as 1930, Newton et al., U.S. Pat. No. 1,776,566, describes reeds for musical instruments whose pores have been adequately filled with cellulose or nitrocellulose in an organic solvent, to render the reed waterproof and resistant to the destructive action of the juices of the human mouth. Ogilvie, U.S. Pat. No. 1,790,167, describes a thin, flexible coating of celluloid material, applied in a quick-drying organic solvent to the surface of the cane reed in such a manner that the reed surface becomes waterproof while the pores inside of the reed remain open, i.e., empty. Petzke, U.S. Pat. No. 3,340,759, describes a natural cane reed whose pores have been impregnated with a cured vinyl plastisol. The plastisol is described as a synthetic resin which is essentially 100% solids, and free of solvents or diluents which would evaporate and cause undesirable shrinkage. The pores of the reed are substantially sealed to prevent moisture absorption, thereby rendering the reed waterproof. Similarly, Knotik et al., U.S. Pat. No. 3,705,820, describes wind instrument reeds which have been soaked in partially polymerized methylmethacrylate which is then polymerized in the reed by ionizing radiation. This treatment fills the pores, effectively waterproofing the reed, and controlling moisture-induced swelling and loss of elasticity.

Other sealing coatings which are applied externally to the natural cane reed have been described. Killian, U.S. Pat. No. 4,145,949, describes a natural cane reed having a thin protective coating of fine particulate matter, e.g., metallic powder, deposited on the tip and edges of the reed but not on the heart or main vibratory section of the reed. A plastic-coated cane reed is also described by Rico International (Sun Valley, Calif.) for musicians who have a limited amount of control over their playing environment or need instant playability without having to re-wet their reeds. These plastic coated reeds have improved durability compared to uncoated reeds, but have playing characteristics which differ markedly from the uncoated natural cane reed.

BRIEF SUMMARY OF THE INVENTION

This invention features methods and compositions for treating the natural cane reed used to produce musical tones in woodwind instruments. The treatment utilizes a polymer or polymerizing solution, preferably a waterborne polymer or waterborne polymerizing solution, to impregnate the reed, but not render the reed waterproof. The absorbed polymer protects the reed from microbial and enzymatic degradation, thereby extending the lifetime of the reed. Surprisingly, this protection can be achieved while allowing the reed to absorb essentially normal levels of moisture from the mouth. The normal playing characteristics of the original reed are thereby either sustained or enhanced over the lifetime of the reed by the treatment.

Preferably a non-toxic waterborne polymer (or other suitable solvent-borne polymer), polymer suspension, polymer emulsion, or an aqueous-based (or other suitable solvent-based) polymerizing solution (collectively termed "waterborne or aqueous polymer treatment liquid," "polymer treatment liquid," or simply "polymer liquid") is used to impregnate the reed material. "Polymer liquid" and similar terms shall refer to both aqueous and non-aqueous liquids unless indicated to the contrary, e.g., a non-aqueous polymer liquid, an aqueous polymer liquid, or an alcoholic polymer liquid. This impregnation can be accomplished by submersion of the entire reed, or at least submersion of the proximal portion, i.e., the mouth-end portion, of the reed, in the polymer liquid under conditions that provide sufficient polymer uptake to provide degradation-resistance, e.g., a liquid contact period of at least 0.5 hr at room temperature and one atmosphere. Impregnation may be accelerated (and the treatment period reduced) by methods well known in the art, including reducing the external pressure over the reed prior to impregnating the reed, and then increasing the external pressure to accelerate the entry of polymer into the pores of the reed. While the use of waterborne polymer treatment liquids are preferred, other liquids can also be used, e.g., alcohols such as ethanol and isopropanol. Preferably, the liquid is non-toxic, at least at residual levels. While the aspects of the present invention are described in connection with exemplary aqueous solutions or emulsions, other embodiments involve other liquids as just indicated. Therefore, the descriptions herein apply to both aqueous and non-aqueous liquids, though aqueous liquids are preferred.

Following contact with the polymer liquid during impregnation, free liquid residing on the surface of the reed is wiped away or otherwise substantially removed. This removal step is useful because the excess polymer material would otherwise dry on the reed surface and might undesirably seal the surface and pores of the reed, rendering it waterproof. The fact that the reed remains water-permeable after the polymer inside the reed has been allowed to dry or cure, has been demonstrated by gravimetric measurement of the rates of water absorption over a 30–60 minute period, comparing the untreated reed with the polymer-treated reed. At a minimum, the initial rate of liquid absorption under specified conditions for the treated reeds (e.g., total weight of water absorbed during the first 30–60 minutes of water immersion, divided by the time of immersion, measured at 22° C. and one atmosphere) remains equal to, or greater than 25% of the rate of liquid absorption for the untreated reed. Preferably, the rate of liquid (e.g., water) absorption for the treated reed remains equal to, or greater than 30%, 40%, 50%, 60% or even more, compared to the rate of absorption for the untreated reed. In many instances, though not necessaily, both the rate and the total amount of liquid (e.g., water) absorption after 10, 30 and 60 minutes of submersion in liquid (e.g., water) for the treated and untreated reeds are very similar (see Examples 1 and 2 below).

Thus, in the present invention, the polymer coating which protects the reed against degradation by saliva, microbial flora, and the like, is formed not as an outer waterproof barrier on the reed surface, but as a coating within the microscopic channels of the porous reed matrix, i.e., within the pores, channels and interstices of the reed. This "internally" protective polymer coating, that allows entry of water into the reed, differs markedly from both the space-filling pore-sealants and the waterproof exterior coatings formed on reeds described in other patents. Most importantly, the playing characteristics and musical sound quality of the untreated reed, are substantially preserved, i.e., sustained in the treated reed. Applicant believes that sustaining a substantial degree of water-permeability in the treated reed may be an important element in preserving many of the original sound characteristics of the untreated reed.

Typical preferred examples of useful aqueous polymer treatment liquids, include water-based emulsions (largely free of organic solvents) from the polyurethane polymer family, water-based emulsions from the polyacrylate polymer family, and combinations thereof. The proportion of polymer solids in the aqueous polymer treatment liquid is between 10% and 60% by weight, preferably 25%–40% by weight. In contrast to Petzke, U.S. Pat. No. 3,340,759, which utilized a resin containing 100% solids, the presence of a substantial proportion of water or other appropriate solvent in the present polymer treatment liquid is advantageous. This is because after the water component in the treatment liquid has evaporated, and normal curing and/or shrinkage of the polymer has occurred, the pores and channels within the reed will remain open because they have been coated rather than filled with polymer.

The polymers in the aqueous (or other) treatment liquid may possess at least a partially hydrophilic polymer component or co-polymer component. Therefore, when the water, i.e., solvent, portion of the coating evaporates, and the polymer, i.e., resin, component has coalesced, dried, polymerized, and/or otherwise fully cured, this partially hydrophilic property of the resin allows water not only to wet the reed's external surface, but also to penetrate the reed's internal channels and pores. Remarkably, this aqueous polymer treatment of the natural cane reed has a negligible effect on the mouthfeel and natural water absorbency of the reed, while the durability and the lifetime of the reed are greatly increased. As an additional benefit, the initial break-in period required for new reeds (the time required for a new reed to develop good playing characteristics) is typically shortened by the aqueous (or other) polymer treatment (see below).

In summary, protective coatings formed in reeds according to the present invention, differ from other reed treatments, as the presently described treatment does not block permeation by water, i.e., the reeds are not rendered waterproof.

The term "waterproof," means that which is "covered or treated with a material to prevent permeation by water" (Websters Third New International Dictionary, G. & C. Mirriam Company, Springfield, Mass.). While it has been recognized by some inventors that the surface of coated reeds should be wettable by water and saliva, it has not been appreciated that treated reeds should also allow water permeation, i.e., water absorption to occur. In fact, the prior treatments lead away from water-permeability, instead teaching that the reed and its pores should be sealed by any one of several different coating treatments to render the reed waterproof.

In contrast, the present invention suggests that water absorption by the cane reed is an important aspect for preserving the natural vibration and tone properties which characterize the untreated reed. Thus, the present invention involves a process of impregnating the porous cane reed to generate a dried/cured, non-toxic protective polymer coating within and about the water-conductive channels, pores, fibers and woody cells constituting the porous structure of the reed, in which the reed structure remains water-permeable.

On a macroscopic scale, the actual rates of water uptake by untreated, and aqueous polymer-treated reeds were measured gravimetrically by submerging reeds in ambient distilled water for defined periods of time, then removing the reeds and wiping away unabsorbed surface water, and finally measuring the precise weight of the reeds to determine the amounts of water absorbed versus the time submerged (see Examples below).

In one aspect, the present invention features a method for treating the natural cane reed used in woodwind musical instruments. The method includes contacting at least the proximal portion of the reed with a polymer treatment liquid (preferably an aqueous liquid), in which this contacting process delivers at least 1% by weight of polymer into the reed based upon the percentage increase in dry weight of that portion of the reed contacted by the liquid. The reed remains substantially water-permeable, yet is rendered resistant to degradation by saliva.

In a related aspect, preferably following the above polymer liquid contacting, the liquid is removed from the surface of the treated reed, allowing the polymer components within the reed to dry or cure and become water-insoluble. For example, the liquid can be wiped away. The surface can further (or alternatively) be cleaned to remove polymer from the surface with an appropriate solvent.

In preferred embodiments, the polymer treatment liquid is water-based and non-toxic.

In preferred embodiments, the polymer treatment liquid is selected from the group consisting of aqueous polyurethanes, aqueous polyacrylates and combinations thereof.

In yet another preferred embodiment, the polymer treatment liquid contains between 10% and 60% (inclusive) by weight polymer solids. More preferably, the polymer treatment liquid contains between 20% and 50% by weight polymer solids. In particular embodiments, the polymer treatment liquid contains 10 to 40%, 30 to 60%, 20 to 40%, or 30 to 50%.

In another aspect, the present invention features a method for treating the natural cane reed used in woodwind musical instruments. The method includes contacting the reed with a polymer treatment liquid (preferably aqueous). The reed absorbs at least one-third of the amount of polymer absorbed by an equivalent untreated reed contacted with the same liquid for 10 hr at 22° C. and 1 atmosphere pressure, where determination of the amount of polymer absorbed is based upon the percentage increase in dry weight of the reed. The reed remains substantially water-permeable, yet is rendered resistant to degradation by saliva. Preferably the reed absorbs at least 40%, 50%, 60%, 70%, 80% 90%, 100% or even more of the amount of polymer absorbed under the above specified conditions.

Preferably following the above liquid contacting, the liquid is removed from the surface of the treated reed, allowing the polymer components within the reed to dry or cure and become water-insoluble. Alternatively, polymer is removed from the surface after at least partially drying or curing, e.g., with an appropriate solvent, or by abrasion or scraping.

In preferred embodiments, the polymer treatment liquid is water-based and non-toxic.

In preferred embodiments, the polymer treatment liquid is selected from the group consisting of aqueous polyurethanes, aqueous polyacrylates and combinations thereof.

In preferred embodiments, the polymer treatment liquid contains between 10% and 60% (inclusive) by weight polymer solids. More preferably, the polymer treatment liquid contains between 20% and 50% by weight polymer solids. In other embodiments, the polymer treatment liquid contains 10 to 40%, 30 to 60%, 20 to 40% or 30 to 50%.

In another aspect, this invention features a method for treating the natural cane reed used in woodwind musical instruments. The method includes the steps of providing a non-toxic (preferably waterborne) polymer treatment liquid, and contacting at least the proximal portion of the reed with the liquid. At least 1% by weight of polymer is delivered into the reed, based upon the percentage increase in dry weight of that portion of the reed contacted by the liquid. Subsequently, contact between the reed and the liquid is ceased, and the liquid is removed from the surface of the reed. Finally, the polymer components within the reed are allowed to dry or cure and become water-insoluble. The reed remains substantially water-permeable, yet is rendered resistant to degradation by saliva.

In another aspect, the present invention provides a natural cane reed for a musical instrument, in which the reed has been impregnated with a polymer treatment liquid (preferably aqueous). At least the proximal portion of the reed has been impregnated by a liquid which contains a non-toxic polymeric material that is water-insoluble upon drying or curing within the reed. The impregnated portion of the reed is at least 25% as permeable to water as an identical portion of an equivalent untreated reed, yet is resistant to degradation by saliva.

In another aspect, a natural cane reed for a musical instrument is provided, in which at least the proximal portion of the reed has been impregnated by a polymer treatment liquid that contains a non-toxic polymeric material that is water-insoluble upon drying or curing within the reed. The impregnated portion of the reed contains at least 1% by weight of the polymer material, based upon the percentage increase in dry weight of the impregnated portion. The impregnated portion of the reed remains substantially water-permeable, yet is resistant to degradation by saliva.

In a preferred embodiment, the non-toxic polymeric material is selected from the group consisting of polyurethanes, polyacrylates and combinations thereof.

In another embodiment, the polymeric material is removed from the surface of the impregnated portion of the reed before the polymeric material has dried or cured, thereby enhancing the water-permeability of the impregnated portion of said reed.

In another preferred embodiment, the reed has been treated with a waterborne polymer treatment liquid selected from the group consisting of aqueous polyurethanes, aqueous polyacrylates and combinations thereof.

In still another preferred embodiment, the reed has been treated with a waterborne polymer treatment liquid comprising between 10% and 60% by weight polymer solids. More preferably, the reed has been treated with a waterborne polymer treatment liquid comprising between 20% and 50% by weight polymer solids.

As used herein, the term "woodwind musical instruments" refers to, and includes all musical instruments that utilize a removably attached reed as described herein, including clarinets, oboes, bassoons, and saxophones. "Natural cane reeds" used in woodwind musical instruments are widely available from commercial sources, and are described herein in considerable detail.

The reed is tapered in thickness, and its proximal end is thinnest (typically 0.003–0.006 inches thick at the tip), making it especially susceptible to degradation by saliva.

The "proximal portion of the reed" is that portion which is placed in the mouth and subjected to wear and tear by vibration and contact with saliva. At a minimum, the first one-quarter inch, and preferably the first one-half inch of the proximal end portion (i.e., the portion of the reed's length measured from the proximal end) should be treated with polymer treatment liquid. For example, at a distance of 0.5 inches from the proximal end of a typical tenor saxophone reed, the reed is still quite thin, ranging from approximately 0.015 to 0.025 inches in thickness, depending upon the distance inward from the side edge of the reed (and varying somewhat among different reed manufacturers). More preferably, at least 0.75, 1.0, and 1.5 inches of the proximal end of the reed are treated with polymer treatment liquid. One inch inward from the proximal end of the tenor reed, the reed's thickness has approximately doubled (compared to its thickness at the 0.5 inch position). The other end of the reed, i.e., the distal or heel portion, is robust and is removably attached to the instrument (e.g., to the mouthpiece). The heel portion is not significantly contacted or degradated by saliva.

"Polymer treatment liquids" as used herein for impregnating reeds are described above in considerable detail. These liquids may be solvent-borne or water-borne polymer solutions, emulsions and the like. Non-toxic water-based polymer treatment liquids are preferred. For example, polyrethanes, polyacrylates and combinations thereof are available in either solvent or non-toxic waterborne coating systems.

The term "non-toxic" is meant to indicate that the dried coating contains no substantial amount of toxic heavy metals or other toxic materials which could be released into the musician's mouth while playing the treated reeds.

The term "contacting" refers to physical contact between the cane reed and the polymer treatment liquid, e.g., submersion of the reed in the polymer liquid. One convenient means of submerging a reed in a polymer liquid is to nearly fill a cylindrical vial (e.g., a plastic or glass "shell vial" measuring ¾–⅞ inch in diameter×3.5 inches tall) with polymer liquid, then place the reed(s) with their thin edge downward into the liquid, and finally cap the vial. A duration of liquid contact between the reed and the polymer treatment liquid of between two and four hours (by submersion in polymer treatment liquid) is typically sufficient for the desired extent of polymer penetration of the reed. Polymer penetration may or may not reach saturation, i.e., that amount of polymer in the reed at which, little or no additional polymer solids will enter the reed with continued polymer liquid contact. At completion of the polymer contacting treatment of the reed, excess or free polymer liquid is removed from the surface of the treated reed. This "removing" may be accomplished, for example, by wiping the wet reed with an absorbent sheet such as a low lint paper towel. Solvent, e.g., water evaporation allows the polymer components in the liquid within the reed to dry or cure and become water-insoluble. After reeds have been fully immersed in polymer treatment liquid for approximately 10 hours at room temperature (22∞ C.) under ambient conditions (1 atmosphere pressure), little if any additional polymer enters the reeds, i.e., the reed's "polymer saturation level" has been reached. After fully drying a polymer-soaked reed, it is typical to measure a 3–4% weight increase in the reed. For the purpose of the present invention, a satisfactory polymer treatment must result in an incorporation of at least 1% by weight of polymer into the cane reed (based upon dry weight of that portion of the reed that has been treated). Preferably, the polymer incorporation is 2% by weight, and more preferably 3% to 4% by weight. Alternatively, at least one-fourth (25%) of the reed's polymer saturation level must be absorbed by the reed (based upon the reed's maximum dry weight increase from polymer solids, e.g., measured after approximately 10 hours soaking). Preferably, polymer absorption in the treated reed reaches 50%, 60%, or 70%. Most preferably, polymer absorption reaches 80%, 90% or even 100% of the reed's polymer absorption capacity at saturation.

The term "substantially water-permeable" when used to describe the treated reeds, means that the treated reeds absorb water at a rate (milligrams of water per minute) that is at least 25% as great as the untreated reeds. Preferably, the water absorption rate is 50% as great, and more preferably 75% or more as great as for an equivalent untreated reed.

The term "resistant to degradation by saliva" means that the treated reed resists softening by contact with saliva over a period of days or weeks of playing the instrument using the reed. More specifically, the lifetime of the treated reed is extended at least 100%, i.e., the reed is playable for at least twice as many hours as an equivalent untreated reed. The lifetime of a reed is determined by the number of hours the reed can be played before it reaches the point that a musician finds the reed too soft, unpredictable, unresponsive or lacking in tone response to continue playing. Aqueous polyurethanes, aqueous polyacrylates and combinations thereof (typically constituting the waterborne polymer treatment liquid used to treat reeds herein) are well known in the art, and commercial examples thereof are provided herein. It is preferred that so-called "interior finish" polyurethanes and polyacrylates are used, rather than exterior finishes since the latter typically contain additives including fungicides, mildewcides, UV protectants and other chemicals that are not suitable for contact with the lips and mouth. In fact, the preferred interior finishes contain no persistent additives, i.e., non-volatile additives, that are toxic or that could be irritating or sensitizing to the lips or the mouth. The 10%–60% or 20%–50% or other range of polymer solids in the polymer treatment liquids is chosen so that the polymer liquid will coat rather than fill the channels and pores in the reed, so as to allow entry of water, i.e., capillary flow of water, after the polymer has dried and/or cured in these channels and pores.

BRIEF DESCRIPTION OF THE SEVERAL VIEWS OF THE DRAWING

FIG. 1 (i) gloss finish aqueous polyurethane; (ii) satin finish aqueous polyurethane; (iii) satin finish alkyd polyurethane; (iv) untreated reed.

FIG. 2 (i and ii duplicate reeds) satin finish aqueous polyurethane; (iii) alcohol-based shellac, 1 coating, (iv) alcohol-based shellac, 2 coatings; and (v) untreated reed.

DETAILED DESCRIPTION OF THE INVENTION

Methods and compositions are described for treating natural cane reeds used in woodwind instruments. The object of this treatment is to protect the reed from microbial and enzymatic degradation caused by contact with saliva. The lifetime of the natural reed is extended, without compromising the playing characteristics of the reed. The treatment utilizes a polymer or polymer solution, preferably a waterborne polymer or waterborne polymerizing solution, to impregnate the reed. Surprisingly, this protection is achieved without the reed being rendered waterproof. The original musical playing characteristics of the reed are reported to be either sustained or enhanced over the extended lifetime of the reed by the treatment.

Method of Treating Reeds

A convenient means for impregnating cane reeds with aqueous polymers described herein is to immerse the entire reed, or at least its proximal portion (i.e., the thinned portion of the reed which is placed in the mouth and therefore susceptible to degradation by saliva) in an aqueous liquid emulsion, suspension, or solution containing the polymer. Alternatively the reed may be immersed in a monomer-containing liquid, wherein the monomer can be polymerized in situ (within the reed), by use of a catalyst, by irradiation, by increased temperature, or the like, to form such a polymer. In the case of aqueous polyurethane polymer impregnation of cane reeds, the reeds may be immersed in commercially available emulsion products. Two polyurethane-containing emulsions which were utilized, were Aqua Zar brand "Water-Based Polyurethane-Interior Gloss" product #32412 LR1194, and Aqua Zar brand "Water-Based Polyurethane-Interior Satin" product #20325925 L891 containing between 30% and 40% by weight solids [United Gilsonite Laboratories (UGL, Inc.), Scranton, Pa.]. The material safety data sheet provided by UGL, Inc. states that in addition to the polyurethane resin component (15% by weight), these Aqua Zar products contain approximately an equal amount of acrylic copolymer resin (15–20% by weight). It is well known in the art that such a mixture of resins provides a combination of properties, i.e., the acrylic resin contributes greater hardness while the polyurethane resin contributes greater elasticity to the dried coating. Reeds were immersed for between 0.5 hr and 12 hr, and preferably between 1 hr and 6 hr. In the case of aqueous polyacrylate polymer treatments, reeds can be similarly immersed in these emulsions (e.g., Clear wood sealer/topcoat #SCX-1970 gloss polyacrylate resin from S.C. Johnson Polymer, Inc. Sturtevant, Wis.). This particular polyacrylate emulsion contained approximately 38% by weight resin solids, to which 3.4% by weight dipropylene glycol methyl ether and 2.3% dipropylene glycol n-butyl ether were added as coalescing solvent. For the purpose of comparing the performance of the above aqueous polymers, with non-aqueous-based coating materials, an alkyd polyurethane varnish (Zar brand "Interior Polyurethane, Clear Wood Finish, satin" product #20106 LR1294, manufactured by UGL, Inc.), and a shellac containing 31% by weight solid shellac in an alcohol-based solvent (Bulls Eye brand manufactured by William Zinsser and Company, Inc., Somerset, N.J.) were obtained and used to treat reeds. Upon removal of all reeds from the polymer emulsions, excess polymer liquid was drained from the reeds, the reeds were briefly wiped with a low lint paper towel, and finally allowed to air-dry at room temperature until the polymer was fully dry and cured (approximately 24 hrs). To accelerate the polymer impregnation process, the reeds and polymer solution may be subjected to a reduced air pressure ( e.g., 1 p.s.i. rather than the normal atmospheric pressure of 14.7 p.s.i.) in order to remove air from within the porous structure of the reed. When the air pressure is then returned to normal (or even increased above atmospheric pressure), the polymer liquid flows easily into the reed channels and pores.

Water Flow into Polymer-Treated Reeds

While the presently described dried and/or cured aqueous polymer coatings (e.g., polyurethane and polyacrylate coatings) may be partially hydrophobic, these coatings must also be sufficiently hydrophilic to allow substantially unimpeded water absorption into the pores of the reed. Normal absorption and capillary movement of water into untreated and polymer-treated reeds has been visualized by light microscopy (through the tips of cane reeds having a thickness of approximately 0.004 inch). Phase contrast light microscopy (150×magnification) of cane reeds whose tips were immersed in distilled water on a glass microscope slide (tenor saxophone reeds manufactured by Rico International Company) was utilized for visualization of capillary water flow. The observation of microscopic air bubbles moving through capillary channels in the reed, as well as air bubbles escaping through the tip end and through surface pores in the reed, and the increasing size of water droplets within intracellular spaces provided direct visual evidence of normal water migration and infiltration into both aqueous polymer-treated and untreated reeds.

Musical Properties of Treated Reeds

A professional musician playing a tenor saxophone (Selmer Inc., Super 80 model) compared the playing properties of the above-described aqueous polyurethane-treated reeds, with both untreated "control" reeds and the above-described alkyd varnish and shellac-treated reeds of the same manufacture (Rico Royal #3) described in Examples 1 and 2. The shellac and alkyd polyurethane-treated reeds were reported to be more difficult to play than untreated reeds and produced a harsh "edgy" and "buzzy" tone. However, the aqueous polyurethane-treated reeds were easily playable, and were described as producing a "natural-sounding" tone equal to or superior to that of the untreated reeds. The dynamic responsiveness of the latter reeds was reported to be excellent over the full tonal range of the instrument. Surprisingly, it was reported by two independent saxophone playing musicians, that while untreated cane reeds always require a break-in period before the reeds exhibit good playability and responsiveness, the aqueous polyurethane-treated reeds required little if any conditioning or break-in period. Typically, the polyurethane-treated reeds could be played immediately with a smoothness and consistency which was superior to untreated cane reeds. Therefore, in addition to extending the lifetime of the natural cane reed, the aqueous polymer treatment facilitates use of new reeds by reducing or eliminating the break-in period.

Extended Lifetime of Treated Reeds

A professional musician (tenor saxophone), who had been accustomed over a period of years to using Rico Royal #3 reeds, switched to playing his instrument using the same reeds which had been treated with the aqueous polyurethane polymer (Zar brand, satin interior finish) according to Example 1. Over a period of three months the musician reported his observations. In addition to eliminating the need for any break-in period (before which the reed is difficult or uncomfortable to play), the musician reported that the polymer-treated reeds remained playable for over a month. The comparable untreated reeds were reported to be playable for only 1–2 weeks (for a comparable average number of hours per day played). The principal difference reported for the treated reeds was a remarkable resistance to the gradual softening process which limits the lifetime of the reed. This resistance is significant because out of a group of ten or more new cane reeds, a professional musician may find only one or two reeds which would be deemed "good to excellent" for their professional playing needs. Extending the lifetime of such selected reeds two or three-fold has a substantial practical as well as a commercial value. Selected used reeds that already have been played for some time (e.g., several days or a week), may also be polymer-treated to extend their lifetime. In the case of such used reeds, it is recommended that the reeds be washed with a mild detergent and dried before treatment. Washing may also include a disinfection treatment, e.g., soaking 2–10 minutes in 3% hydrogen peroxide solution.

EXAMPLES

Example 1

Reeds were impregnated by submerging them in either aqueous polyurethane resin (see above) for 4 hr or in alkyd polyurethane resin for 2.5 hr. Reeds were drained and wiped free of surface liquid polyurethane, and dried overnight. The amounts of absorbed water were then gravimetrically measured as a function of the time for which the reeds were immersed in distilled water (at room temperature) as described above. Reeds treatments were as follows for single reeds: (i) gloss finish aqueous polyurethane-treated; (ii) satin finish aqueous polyurethane-treated; (iii) satin finish alkyd, i.e., oil-based polyurethane-treated; and (iv) untreated cane reed "control". All reeds were Rico Royal tenor saxophone #3 reeds, Rico International, Inc., Sun Valley, Calif.).

Figure 1:
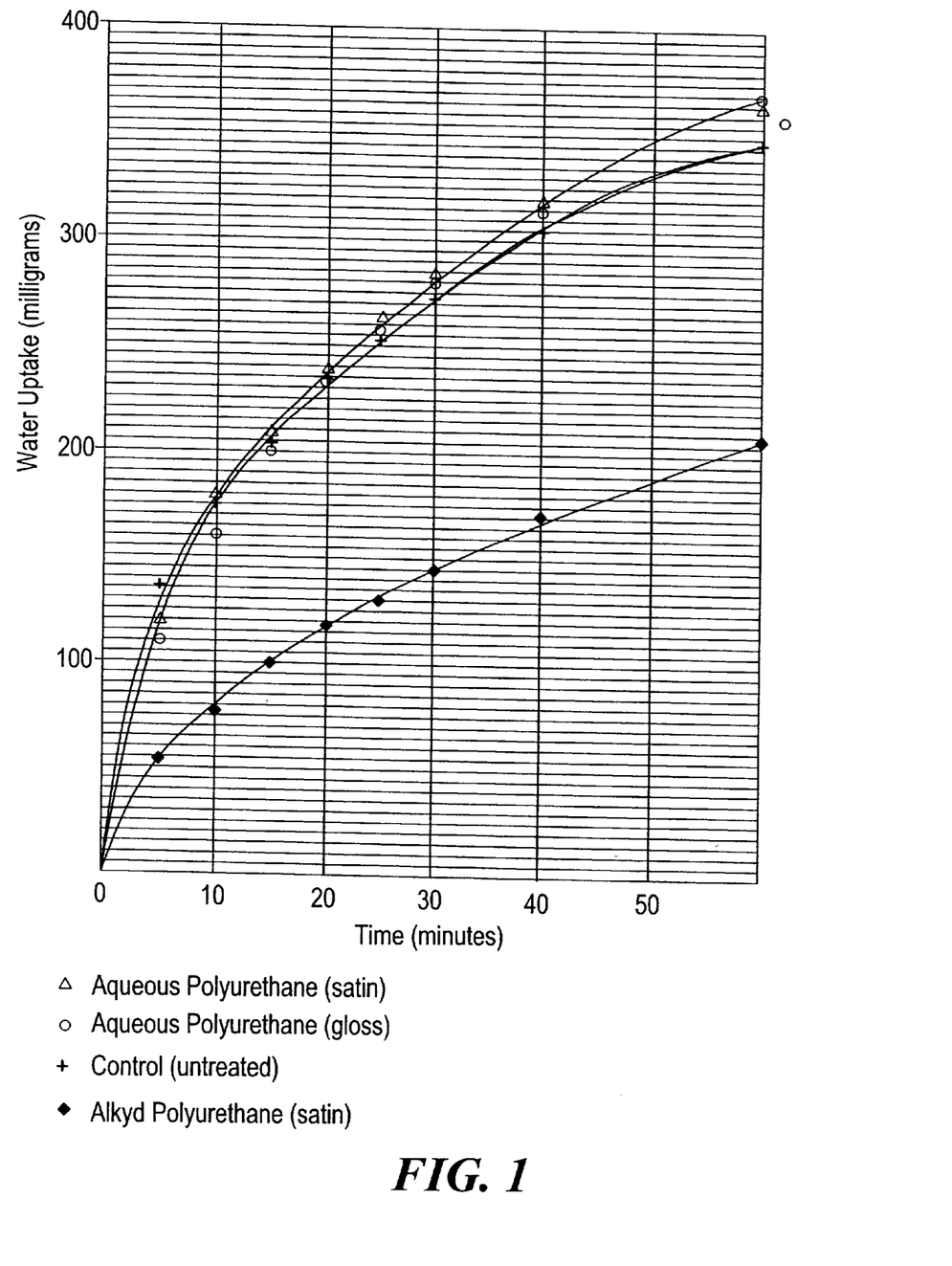
FIGS. 1 and 2 are graphical representations of relative porosities of polymer-treated reeds as evidenced by the amount (weight) of water absorbed by individual treated and untreated natural cane reeds, as a function of the time immersed in water (see Examples 1 and 2 below, respectively). Polymer treatments were as follows.

The results of this experiment (see FIG. 1) show that treatment of natural cane reeds with either of two aqueous polyurethane polymer formulations (gloss or satin finish), caused very little change in the rate of water absorption compared to an untreated reed. The presence of fumed silica (dulling agent in the satin finish product) did not appear to influence water permeability. By contrast, the alkyd polyurethane treatment significantly diminished permeability to water (by approximately 50%–60% during the first 15 minutes of water exposure). This decrease occurred despite the fact that free, i.e., unabsorbed resin liquid had been wiped from the reed following treatment (same as for the aqueous polyurethane treated reeds), and immersion time in the alkyd polyurethane was shorter than in the aqueous treatment.

Example 2

Reeds were impregnated with polymer coating materials, surface-wiped upon removal from the polymer treatment liquids, dried overnight, and tested for water absorption, i.e., relative permeability to water, as in Example 1, except that the reed treatments were as follows: (i) and (ii) duplicate reeds immersed for 8 hr in satin finish aqueous polyurethane (36% solids); (iii) single reed immersed for 8 hr in shellac (Bulls Eye brand, 33% by weight solids), (iv) single reed immersed for 8 hr in shellac, wiped, dried, briefly re-immersed in shellac for 10 min, re-wiped, and re-dried (two shellac treatments); and (v) single untreated cane reed "control".

Figure 2:
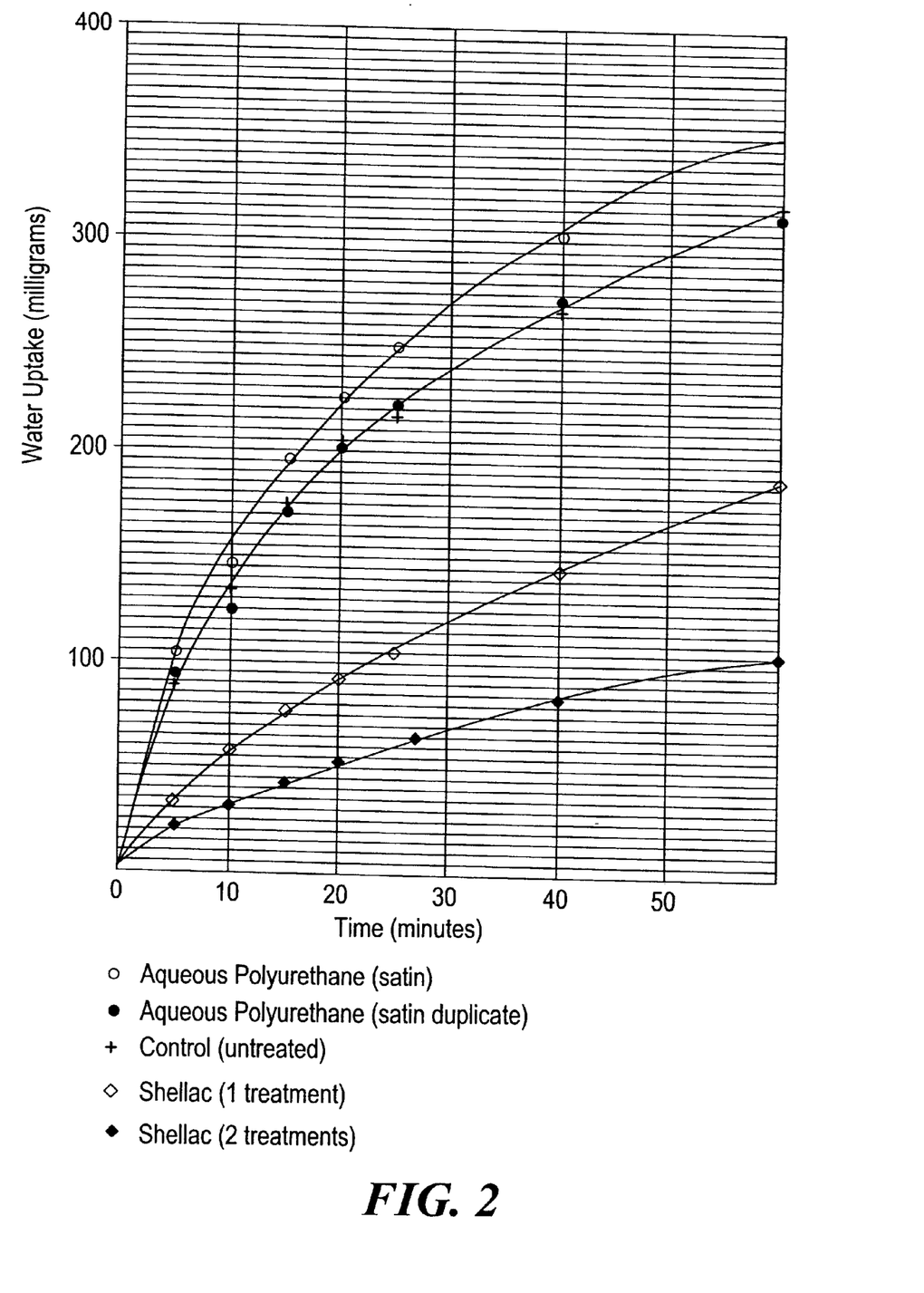

The results of this experiment (see FIG. 2) confirm those results of Example 1. Again, even with prolonged immersion in aqueous polyurethane, water absorption in the treated reeds is similar to that of untreated reeds. It should be emphasized that the step in which excess surface liquid (polyurethane polymer) is wiped or otherwise removed from the reed (following the polymer immersion treatment, and prior to drying and curing) is crucial for maintaining water permeability in the reed. If this step is not followed, and a continuous polyurethane polymer coating (either aqueous or alkyd-based) is allowed to form over the reed's surface, the reed subsequently exhibits very little water permeability (data not shown). Regarding the shellac treatment of reeds, the single treatment decreased water permeability by approximately 60% during the first 15 minutes of water exposure, while two shellac treatments (with a drying step in between) decreased water permeability by approximately 80% during the same time period.

Example 3

Figure 3:
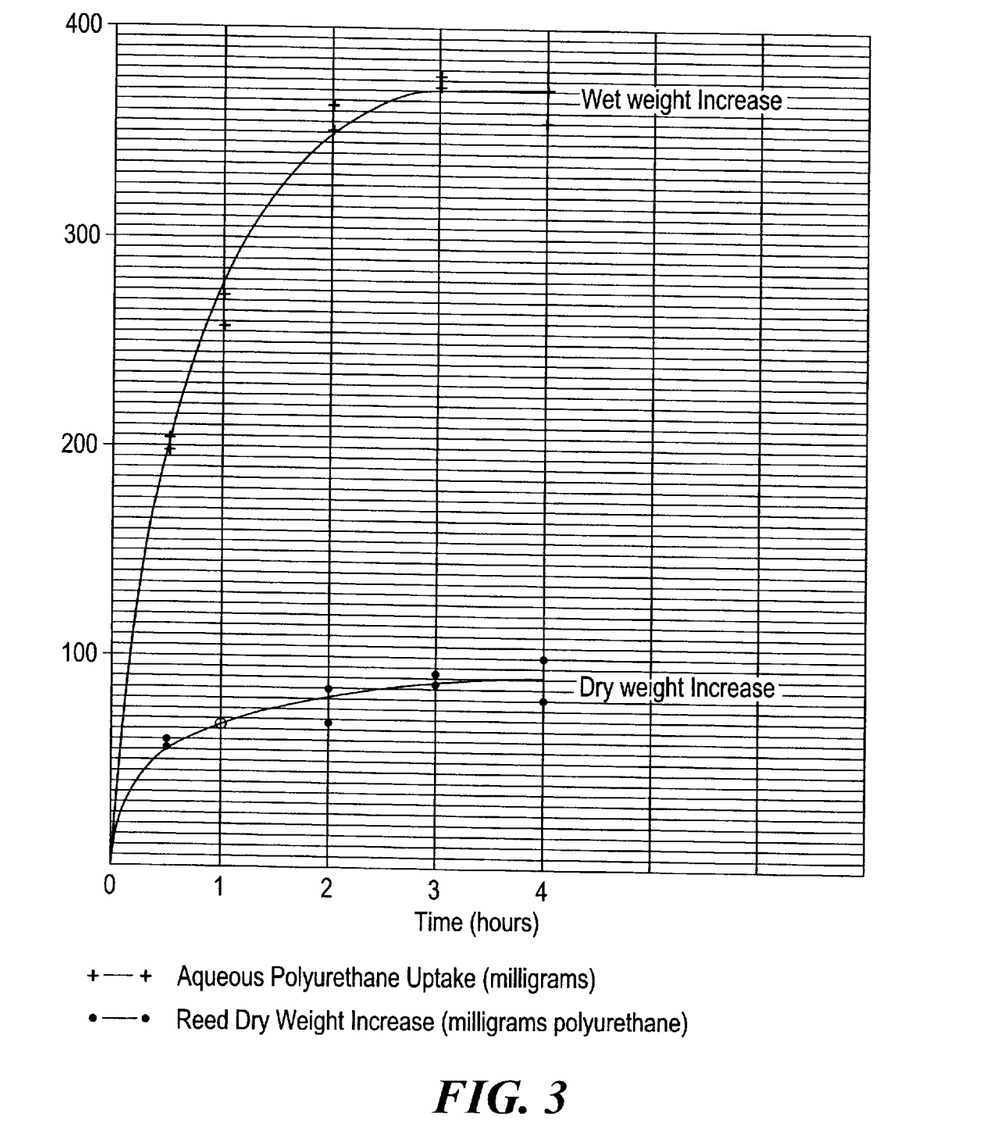
FIG. 3 is a graphical representation of the uptake of polyurethane polymer treatment liquid and actual polymer solids by natural cane reeds, as evidenced by: (i) the amount (weight) of treatment liquid absorbed by individual reeds as a function of time immersed in the treatment liquid; and (ii) the net increase in dry weight of these same reeds due to absorbed polymer solids (two reeds weighed "wet" and then dried at each time interval, see Example 3 below).

To determine the immersion time required for saturating untreated reeds with aqueous polyurethane polymer, five pairs of untreated natural cane reeds (Rico Royal tenor saxophone #3 reeds) were treated for increasing periods of time by submerging them in Aqua Zar brand "Water-Based Polyurethane-Interior Gloss" (see above). Accordingly, after 0.5 hr, 1 hr, 2 hr, 3 hr and 4 hr of polymer treatment, pairs of reeds which had been accurately weighed before treatment were removed from the polyurethane, drained and wiped free of surface liquid, and weighed again to determine the amount of liquid absorbed. For experimental reproducibility, prior to weighing, the reeds were incubated overnight in a warming oven (45° C.) to assure a constant level of relative humidity in the reeds both before and after polyurethane treatment. In this manner an accurate measurement of the increase in dry weight of the reeds, i.e., the actual amount of polymer absorbed by the reeds, could be determined. The results of this experiment (see FIG. 3) indicate that for the first two hours, the cane reeds rapidly absorbed liquid after which time absorption slowed markedly. Measurement of the increase in dry weight of the reeds shows similar kinetics for polymer uptake (saturation within approximately 3 hrs). Therefore, a treatment duration, i.e., liquid immersion of 2–4 hours, is typically sufficient for achieving saturation.

Interestingly, the actual proportion of polymer solids being absorbed by the reeds compared to absorbed liquid was approximately 10% (e.g., 30–40 mg solids absorbed versus 350–400 mg liquid), while the polyurethane treatment liquid contained 36% by weight solids. The more rapid entry of water compared to absorbed polymer indicates that the pores of the reed partially restrict entry of polymer material. This is not surprising given that the particle size reported by the manufacturer for this waterborne polyurethane coating is approximately 0.5–1.0 microns.

Example 4

Waterborne acrylates constitute another major polymeric coating group that Applicant has used to treat natural cane reeds, to protect them from degradation, and extend their playable lifetime. To determine the immersion time required for saturating untreated reeds with an aqueous polyacrylate polymer, five pairs of untreated natural cane reeds (Rico Royal tenor saxophone #3.5 reeds) were treated for increasing periods of time by submerging them in a styrene-acrylic coating solution. This solution, containing 29% by weight solids, and known in the art as a "one pack self-crosslinking polymer" contained (by weight percentages): 76% styrene acrylic emulsion #SCX-1970 (8% by weight solids) manufactured by S.C. Johnson Polymer, Inc. Sturtevant, Wis., 17.3% water, and as coalescing solvents, 4% dipropylene glycol methyl ether (DPM) and 2.7% dipropylene glycol n-butyl ether (DPnB). The manufacturer of SCX-1970 reports that the styrene acrylic particle size is approximately 0.1 microns. After 0.5 hr, 1 hr, 2 hr, 3 hr and 7 hr of submersing the pairs of reeds in closed vials containing the waterborne polyacrylate solution, pairs of reeds which had been accurately weighed before treatment, were removed from the solution, wiped free of surface liquid, and briefly weighed to determine the amount of liquid absorbed. As in Example 3, prior to determining final dry weights (to determine amount of incorporated polymer in the reeds), the reeds were incubated overnight in a warming oven (45° C.) to assure a constant level of relative humidity in the reeds both before and after acrylate treatment. The results of this experiment (not shown) differed only slightly from those in Example 3. As in Example 3, the actual proportion of polymer solids absorbed by the reeds at saturation, compared to absorbed liquid, was approximately 7%–10% (e.g., 30 mg solids absorbed versus 300 mg liquid) while the styrene acrylic treatment solution contained 29% by weight solids. Again, as in Example 3, the more rapid entry of water compared to absorbed polymer indicates that the pores of the reed partially restrict entry of polymer material.

All patents and publications mentioned in the specification are indicative of the levels of skill of those skilled in the art to which the invention pertains. All references cited in this disclosure are incorporated by reference to the same extent as if each reference had been incorporated by reference in its entirety individually.

One skilled in the art would readily appreciate that the present invention is well adapted to carry out the objects and obtain the ends and advantages mentioned, as well as those inherent therein. The specific methods and compositions described herein as presently representative of preferred embodiments are exemplary and are not intended as limitations on the scope of the invention. Changes therein and other uses will occur to those skilled in the art which are encompassed within the spirit of the invention are defined by the scope of the claims.

It will be readily apparent to one skilled in the art that varying substitutions and modifications may be made to the invention disclosed herein without departing from the scope and spirit of the invention. For example, those skilled in the art will recognize that the invention may suitably be practiced using any of a variety of sources of said polymer treatment liquids.

The invention illustratively described herein suitably may be practiced in the absence of any element or elements, limitation or limitations which is not specifically disclosed herein. Thus, for example, in each instance herein any of the terms "comprising," "consisting essentially of" and "consisting of" may be replaced with either of the other two terms. The terms and expressions which have been employed are used as terms of description and not of limitation, and there is not intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group. For example, if there are alternatives A, B, and C, all of the following possibilities are included: A separately, B separately, C separately, A and B, A and C, B and C, and A and B and C. Thus, the embodiments expressly include any subset or subgroup of those alternatives, for example, any subset of the types of polymer treatment liquids. While each such subset or subgroup could be listed separately, for the sake of brevity, such a listing is replaced by the present description.

While certain embodiments and examples have been used to describe the present invention, many variations are possible and are within the spirit and scope of the invention. Such variations will be apparent to those skilled in the art upon inspection of the specification, drawings and claims herein.

Other embodiments are within the following claims.

What is claimed is:

1. A method for treating the natural cane reed used in woodwind musical instruments, comprising contacting at least the proximal portion of said reed with a polymer treatment liquid, wherein said contacting with said liquid delivers at least 1% by weight of polymer into said reed based upon the percentage increase in dry weight of that portion of said reed contacted by said liquid, and wherein said reed remains substantially water-permeable, yet is rendered resistant to degradation by saliva.

2. The method of claim 1, wherein following said contacting, said liquid is removed from the surface of the treated reed, allowing the polymer components within said reed to dry or cure and become water-insoluble.

3. The method of claim 1, wherein said polymer treatment liquid is water-based and non-toxic.

4. The method of claim 1, wherein said polymer treatment liquid is selected from the group consisting of aqueous polyurethanes, aqueous polyacrylates and combinations thereof.

5. A method for treating the natural cane reed used in woodwind musical instruments, comprising contacting said reed with a polymer treatment liquid, wherein said reed absorbs at least one-third of the amount of polymer absorbed by an equivalent untreated reed contacted with said liquid for 10 hr at 22° C. and 1 atmosphere pressure, said amount of polymer being based upon the percentage increase in dry weight of said reed, and wherein said reed remains substantially water-permeable, yet is rendered resistant to degradation by saliva.

6. The method of claim 5, wherein following said contacting, said liquid is removed from the surface of the treated reed, allowing the polymer components within said reed to dry or cure and become water-insoluble.

7. The method of claim 5, wherein said polymer treatment liquid is water-based and non-toxic.

8. The method of claim 5, wherein said polymer treatment liquid is selected from the group consisting of aqueous polyurethanes, aqueous polyacrylates and combinations thereof.

9. The method of claim 1, wherein said polymer treatment liquid comprises between 10% and 60% by weight polymer solids.

10. The method of claim 1, wherein said polymer treatment liquid comprises between 20% and 50% by weight polymer solids.

11. A method for treating the natural cane reed used in woodwind musical instruments, comprising the steps of:

providing a non-toxic waterborne polymer treatment liquid, contacting at least the proximal portion of said reed with said liquid, wherein at least 1% by weight of polymer is delivered into said reed, based upon the percentage increase in dry weight of that portion of said reed contacted by said liquid, ceasing contact between said reed and said liquid, removing said liquid from the surface of said reed, and allowing the polymer components within said reed to dry or cure and become water-insoluble, wherein said reed remains substantially water-permeable, yet is rendered resistant to degradation by saliva.

12. A polymer-impregnated natural cane reed for a musical instrument, wherein at least the proximal portion of said reed has been impregnated by a liquid comprising a non-toxic polymeric material that is water-insoluble upon drying or curing within said reed, and wherein the impregnated portion of said reed is at least 25% as permeable to water as an identical portion of an equivalent untreated reed, yet is resistant to degradation by saliva.

13. A polymer-impregnated natural cane reed for a musical instrument, wherein at least the proximal portion of said reed has been impregnated by a liquid comprising a non-toxic polymeric material that is water-insoluble upon drying or curing within said reed, and wherein the impregnated portion of said reed contains at least 1% by weight of said polymer material, based upon the percentage increase in dry weight of said impregnated portion, and wherein said impregnated portion remains substantially water-permeable, yet said impregnated portion is resistant to degradation by saliva.

14. The reed of claim 12, wherein said non-toxic polymeric material is selected from the group consisting of polyurethanes, polyacrylates and combinations thereof.

15. The reed of claim 12, wherein said reed has been treated with a waterborne polymer treatment liquid selected from the group consisting of aqueous polyurethanes, aqueous polyacrylates and combinations thereof.

16. The reed of claim 12, wherein said polymeric material is removed from the surface of said impregnated portion of said reed before said polymeric material has dried or cured, thereby enhancing the water-permeability of said impregnated portion of said reed.

17. The reed of claim 12, wherein said reed has been treated with a waterborne polymer treatment liquid comprising between 10% and 60% by weight polymer solids.

18. The reed of claim 12, wherein said reed has been treated with a waterborne polymer treatment liquid comprising between 20% and 50% by weight polymer solids.

* * * * *

UNITED STATES PATENT AND TRADEMARK OFFICE
CERTIFICATE OF CORRECTION

PATENT NO.    : 6,346,663 B1
DATED         : February 12, 2002
INVENTOR(S)   : Daniel Perlman It is certified that error appears in the above-identified patent and that said Letters Patent is hereby corrected as shown below:

<u>Column 3,</u>
Line 52, "necessaily," should read -- necessarily, --; and
Line 60, "channels of the" should read -- channels and hollows of the --.

Signed and Sealed this

Nineteenth Day of November, 2002

Attest:

Attesting Officer

JAMES E. ROGAN
*Director of the United States Patent and Trademark Office*